United States Patent
Cheng

(10) Patent No.: US 6,206,195 B1
(45) Date of Patent: Mar. 27, 2001

(54) IMPACT PROTECTING MODULAR BLOCK FOR SHIELDING AN INDUSTRIAL COMPUTER FROM IMPACT

(75) Inventor: Ted Cheng, Hsinchu Hsien (TW)

(73) Assignee: Getac Corporation (TW)

( * ) Notice: Subject to any disclaimer, the term of this patent is extended or adjusted under 35 U.S.C. 154(b) by 0 days.

(21) Appl. No.: 09/405,525

(22) Filed: Sep. 23, 1999

(51) Int. Cl.⁷ .................................................. B65D 85/30
(52) U.S. Cl. ............................................ 206/586; 248/345.1
(58) Field of Search .................................. 206/320, 453, 206/521, 523, 586; 190/37; 248/188.9, 345.1; 220/732; 312/223.1

(56) References Cited

U.S. PATENT DOCUMENTS

| | | | |
|---|---|---|---|
| 3,836,043 | * | 9/1974 | Levin ................................. 248/345.1 |
| 4,877,673 | * | 10/1989 | Eckel et al. .......................... 206/586 |
| 5,363,617 | * | 11/1994 | Miller ................................. 248/345.1 |
| 5,401,091 | * | 3/1995 | Landry ................................ 312/223.1 |
| 5,657,955 | * | 8/1997 | Adams ................................. 248/345.1 |
| 5,947,290 | * | 9/1999 | Loeschen ............................ 206/453 |
| 6,019,223 | * | 2/2000 | Harfist ................................ 206/523 |

* cited by examiner

*Primary Examiner*—Davidt T. Fidei
(74) *Attorney, Agent, or Firm*—Ira D. Finkelstein; Howrey Simon Arnold & White, LLP

(57) ABSTRACT

An impact protecting modular block includes an anchoring portion adapted to be secured on a corner of an industrial computer, and an abutment portion integrally formed with and extending transverse to the anchoring portion and adapted to abut against a surrounding wall of the industrial computer. The anchoring portion of a first modular block can be stacked upon and can be secured on the anchoring portion of a second modular block so as to permit the abutment portion of the first modular block to abut against the abutment portion of the second modular block, thereby raising rear corners of the base body relative to front corners of the base body of the industrial computer for convenient operation.

3 Claims, 4 Drawing Sheets

IMPACT PROTECTING MODULAR BLOCK FOR SHIELDING AN INDUSTRIAL COMPUTER FROM IMPACT

BACKGROUND OF THE INVENTION

1. Field of the Invention

This invention relates to an impact protecting modular block, more particularly to an impact protecting modular block for shielding an industrial computer from impact.

2. Description of the Related Art

A conventional industrial computer is bulky and clumsy to move or carry, thereby resulting in the risk of damaging the industrial computer when moving the same.

SUMMARY OF THE INVENTION

The object of the present invention is to provide an impact protecting modular block which is adapted to be mounted on an industrial computer for shielding the latter from impact.

According to this invention, the impact protecting modular block includes an anchoring portion and an abutment portion. The anchoring portion has an anchoring inner surface wall adapted to be secured on an outer major surface wall at one corner of an industrial computer, and an anchoring outer surface wall opposite to the anchoring inner surface wall. The abutment portion has an abutment inner surface wall and an abutment outer surface wall which are integrally and respectively formed with and which extend transverse to the anchoring inner surface wall and the anchoring outer surface wall. The abutment inner surface wall is adapted to abut against a surrounding wall of the industrial computer when the anchoring inner surface wall of the anchoring portion is brought to be secured on the outer major surface wall. In addition, the anchoring inner surface wall of the anchoring portion of a first modular block can be stacked upon and can be secured on the anchoring outer surface wall of the anchoring portion of a second modular block so as to permit the abutment inner surface wall of the abutment portion of the first modular block to abut against the abutment outer surface wall of the abutment portion of the second modular block, thereby raising rear corners of the base body relative to front corners of the base body of the industrial computer for convenient operation. The modular block further includes fastening means adapted for detachably fastening the anchoring portion of the second modular block on the outer major surface wall, and for detachably fastening the anchoring portion of the first modular block on the anchoring portion of the second modular block.

In one embodiment, the fastening means includes screw holes and screw fasteners. In another embodiment, the fastening means includes mortises and tenons.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
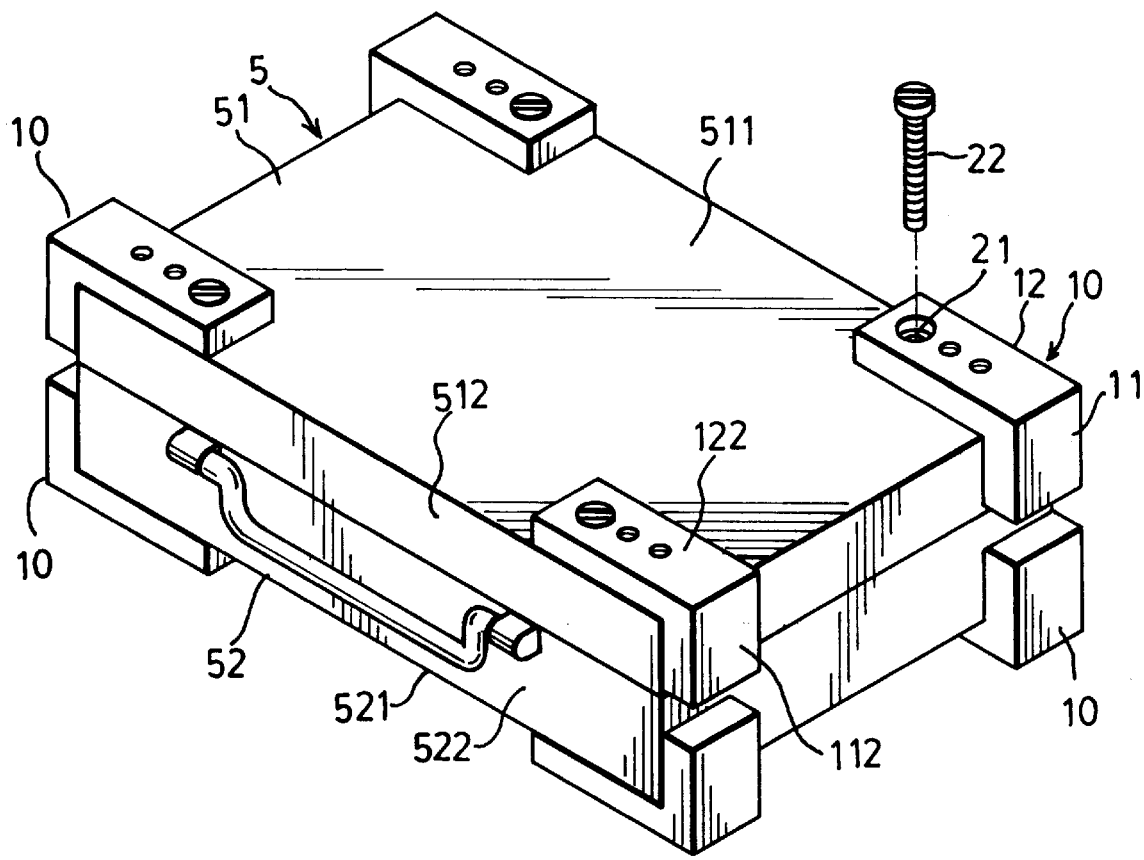
FIG. 1 is a perspective view showing how an impact protecting modular block is mounted on an industrial computer according to the first preferred embodiment of this invention.
Figure 2:
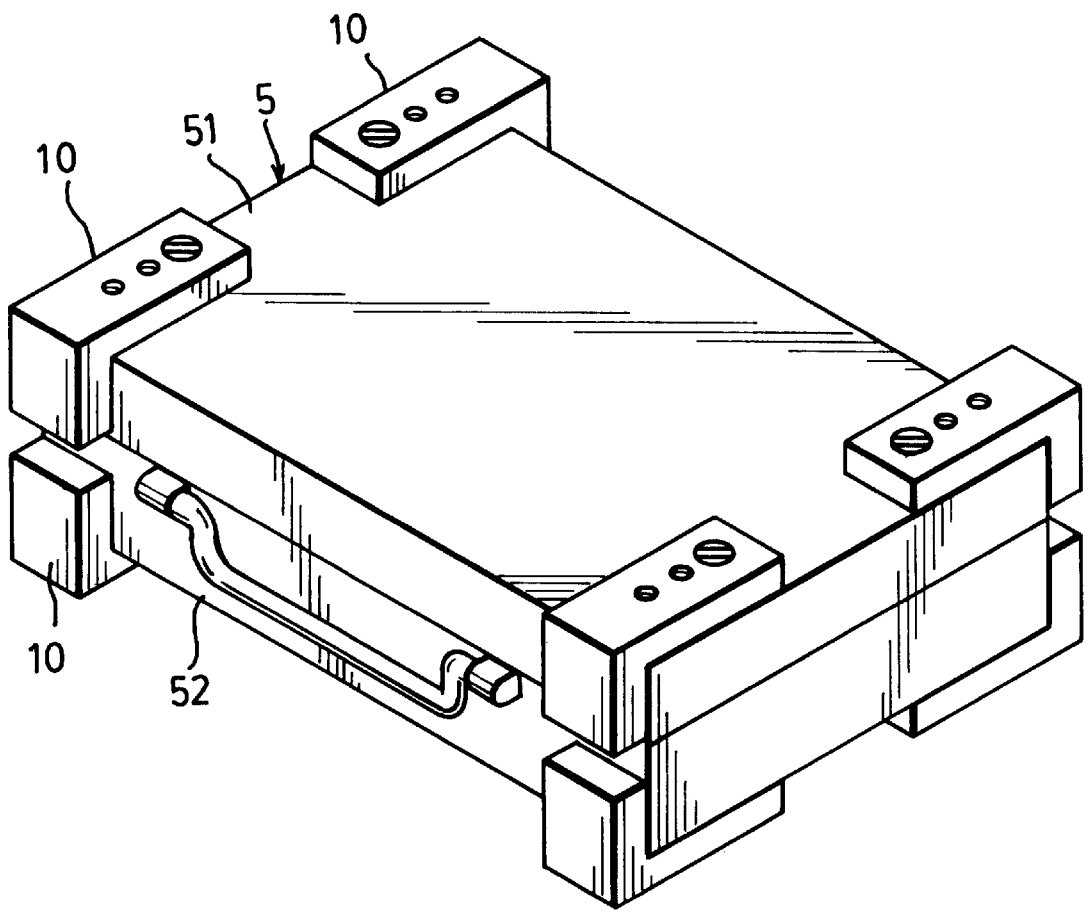
FIG. 2 is a perspective view showing the modular block mounted on the industrial computer in another state.

Referring to FIGS. 1 to 4, the first preferred embodiment of the impact protecting modular block 10 according to the present invention is shown to be mounted on an industrial computer 5. The industrial computer 5 includes a base body 52 with a keyboard (not shown) disposed thereon, and an upper cover 51 which is hinged to the base body 52 at the rear side edges thereof so as to cover the keyboard. Each of the base body 52 and the upper cover 51 has an outer major surface wall 511,521 which extends in a first direction, a surrounding wall 512,522 which extends in a second direction transverse to the first direction from a peripheral edge of the outer major surface wall 511,521, and four front and rear corners which are formed between the outer major surface wall 511,521 and the surrounding wall 512,522. Eight of the impact protecting modular blocks 10 are mounted on the corners, respectively.

The modular block 10 is of an L-shaped cross-section, and includes an anchoring portion 12, an abutment portion 11, and fastening means. The anchoring portion 12 has an anchoring inner surface wall 121 which is secured on the outer major surface wall 511,521 of one of the base body 52 and the upper cover 51 at one of the corners, and an anchoring outer surface wall 122 opposite to the anchoring inner surface wall 121 in the second direction. The abutment portion 11 has an abutment inner surface wall 111 and an abutment outer surface wall 112 which are integrally and respectively formed with and which extend transverse to the anchoring inner surface wall 121 and the anchoring outer surface wall 122. The abutment inner surface wall 111 can abut against the surrounding wall 512,522 of one of the base body 52 and the upper cover 51 when the anchoring inner surface wall 121 of the anchoring portion 12 is brought to be secured on the outer major surface wall 511,521. The fastening means includes a plurality of screw holes 21 which are formed in tandem in and along the anchoring portion 12, and which extend from the anchoring outer surface wall 122 through the anchoring inner surface wall 121. A plurality of screw fasteners 22 pass threadedly through the screw holes 21. One of the screw fasteners 22 can engage a threaded hole (not shown) which is disposed in the outer major surface wall 511,521 so as to fasten the anchoring portion 12 on the outer major surface wall 511,521. As such, referring to FIGS. 1 and 2, the eight modular blocks 10 are secured on the corners of the industrial computer 5 for shielding the latter from impact.

Figure 3:
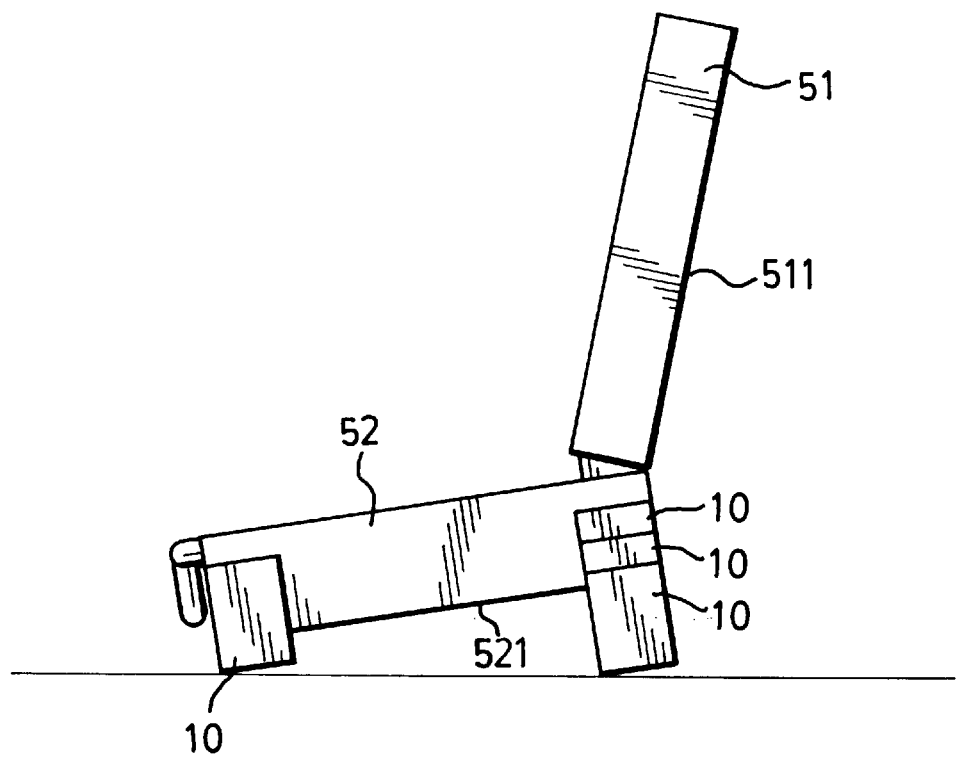
FIG. 3 is a side view showing the modular block when mounted on the industrial computer.
Figure 4:
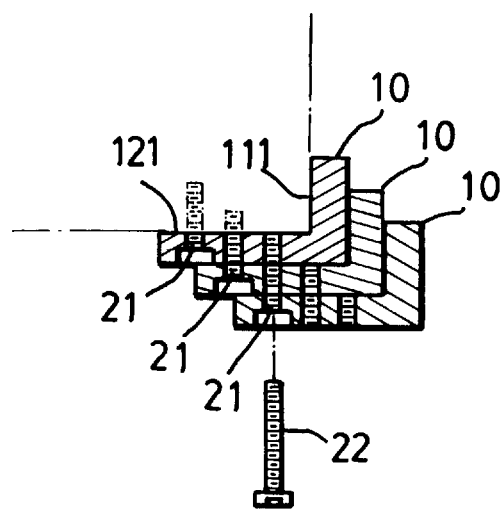
FIG. 4 is a sectional view showing how the modular block is fastened on the industrial computer.

Referring to FIGS. 3 and 4, when the upper cover 51 is rotated relative to the base body 52 to use the industrial computer 5, the four modular blocks 10, which are mounted on the upper cover 51, can be detached by loosening the screw fasteners 22. Two of the detached modular blocks 10 can be stacked upon each of the two modular blocks 10 mounted on the respective rear corner of the base body 52. That is, the anchoring inner surface wall 121 of the anchoring portion 12 of each of the detached modular blocks 10 can be stacked upon and can be secured on the anchoring outer surface wall 122 of the anchoring portion 12 of the stacked modular block 10 by the loosened screw fasteners 22 so as to permit the abutment inner surface wall ill of the abutment portion 11 of the detached modular block 10 to abut against the abutment outer surface wall 112 of the abutment portion 11 of the stacked modular block 10. Therefore, the rear corners of the base body 52 can be raised relative to the front corners of the base body 52, thereby rendering the operation of the industrial computer 5 convenient and comfortable.

Figure 5:
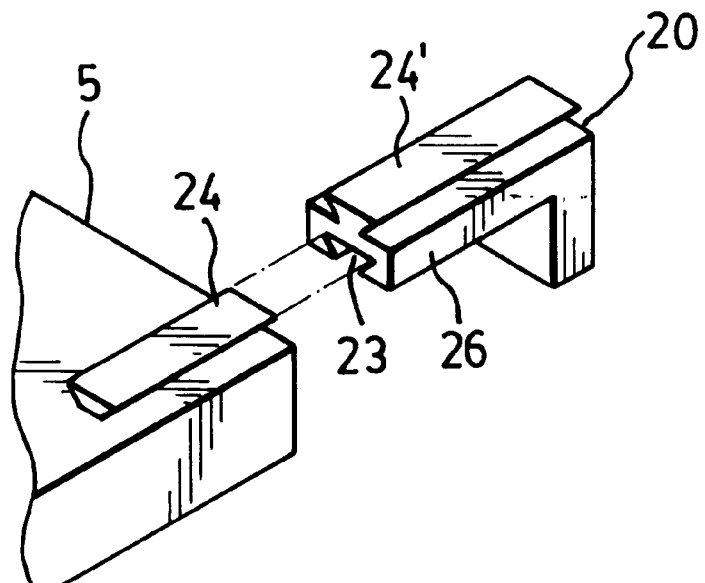
FIG. 5 is an exploded view showing the modular block according to the second preferred embodiment of this invention.
Figure 6:
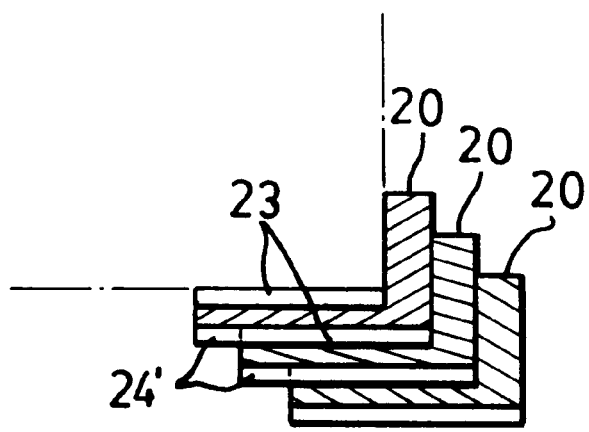
FIG. 6 is a sectional view showing the modular block of the second preferred embodiment when mounted on the industrial computer.

Referring to FIGS. 5 and 6, in another embodiment, the fastening means includes a plurality of mortises 23, each of which is formed in the anchoring inner surface wall of the anchoring portion 26 of the modular block 20, and a plurality of tenons 24,24', each of which is formed on the outer major surface wall of the industrial computer and on the anchoring outer surface wall of the anchoring portion 26. Each of the mortises 23 and the tenons 24,24' is of a dovetail shape along the first direction such that the mortises 23 can be brought to join with the respective tenons 24 to fasten the modular blocks 20 on the industrial computer 5. In addition, the modular blocks 20, which are mounted on the upper cover 51, can be easily removed for stacking upon the modular blocks 20 on the rear corners of the base body 52. The mortise 23 of each of the removed modular blocks 20 can be joined with the tenon 24' of the respective stacked modular block 20, as shown in FIG. 6.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. An impact protecting modular block for shielding an industrial computer from impact, the industrial computer having a base body and an upper cover hinged to the base body, each of the base body and the upper cover having an outer major surface wall extending in a first direction, a surrounding wall extending in a second direction transverse to the first direction from a peripheral edge of the outer major surface wall, and a plurality of front and rear corners formed between the outer major surface wall and the surrounding wall, said modular block comprising:

an anchoring portion having an anchoring inner surface wall adapted to be secured on the outer major surface wall of one of the base body and the upper cover at one of the corners, and an anchoring outer surface wall opposite to said anchoring inner surface wall in the second direction;

an abutment portion having an abutment inner surface wall and an abutment outer surface wall integrally and respectively formed with and extending transverse to said anchoring inner surface wall and said anchoring outer surface wall, said abutment inner surface wall being adapted to abut against the surrounding wall of said one of the base body and the upper cover when said anchoring inner surface wall of said anchoring portion is brought to be secured on the outer major surface wall, said anchoring and abutment portions having a length sufficient for said anchoring inner surface wall of said anchoring portion of a first modular block to be stacked upon and to be secured on said anchoring outer surface wall of said anchoring portion of a second modular block so as to permit said abutment inner surface wall of said abutment portion of said first modular block to abut against said abutment outer surface wall of said second modular block, thereby raising the rear corners of the base body relative to the front corners of the base body; and means for detachably fastening said anchoring portion of said first modular block on said anchoring portion of said second modular block, and adapted for fastening said anchoring portion of said second modular block on the outer major surface wall, said fastening means including first and second screw holes formed in tandem in and along said anchoring portion and extending from said anchoring outer surface wall through said anchoring inner surface wall, and first and second screw fasteners passing threadedly and respectively through said first and second screw holes in said second modular block, said first screw fastener being adapted to engage a threaded hole disposed in the outer major surface wall, said second screw fastener passing through said second screw hole in said second modular block and engaging said first screw hole in said first modular block which is stacked on said second modular block.

2. An impact protecting modular block for shielding an industrial computer from impact, the industrial computer having a base body and an upper cover hinged to the base body, each of the base body and the upper cover having an outer major surface wall extending in a first direction, a surrounding wall extending in a second direction transverse to the first direction from a peripheral edge of the outer major surface wall, and a plurality of front and rear corners formed between the outer major surface wall and the surrounding wall, said modular block comprising:

an anchoring portion having an anchoring inner surface wall adapted to be secured on the outer major surface wall of one of the base body and the upper cover at one of the corners, and an anchoring outer surface wall opposite to said anchoring inner surface wall in the second direction;

an abutment portion having an abutment inner surface wall and an abutment outer surface wall integrally and respectively formed with and extending transverse to said anchoring inner surface wall and said anchoring outer surface wall, said abutment inner surface wall being adapted to abut against the surrounding wall of said one of the base body and the upper cover when said anchoring inner surface wall of said anchoring portion is brought to be secured on the outer major surface wall, said anchoring and abutment portions having a length sufficient for said anchoring inner surface wall of said anchoring portion of a first modular block to be stacked upon and to be secured on said anchoring outer surface wall of said anchoring portion of a second modular block so as to permit said abutment inner surface wall of said abutment portion of said first modular block to abut against said abutment outer surface wall of said second modular block, thereby raising the rear corners of the base body relative to the front corners of the base body; and means for detachably fastening said anchoring portion of said first modular block on said anchoring portion of said second modular block, and adapted for fastening said anchoring portion of said second modular block on the outer major surface wall, said fastening means including a first mortise disposed in said anchoring inner surface wall and adapted to join with a tenon unit provided on the outer major surface wall, and a first tenon disposed on said anchoring inner surface wall for joining with said first mortise of another modular block.

3. The modular block as claimed in claim 2, wherein said first tenon is of a dovetail shape and is brought to join with said first mortise along the first direction.

* * * * *